March 8, 1955     G. V. CARLSON     2,703,635
CORNER CONSTRUCTION FOR WINDOW FRAMES
Filed April 2, 1949
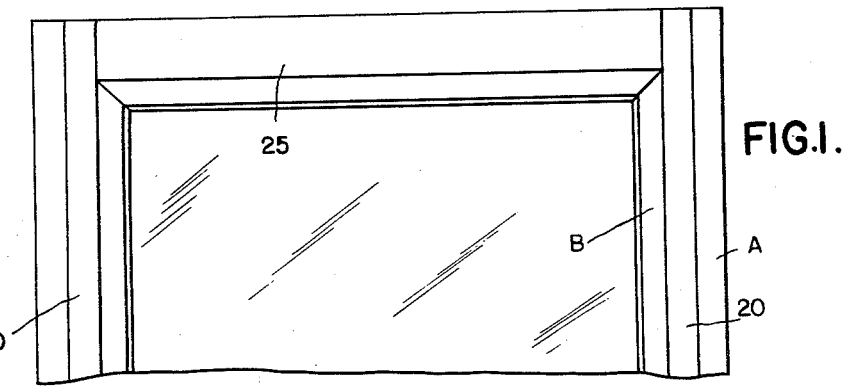
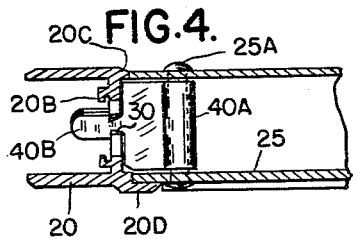
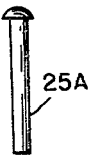
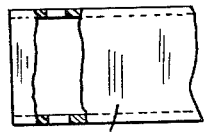
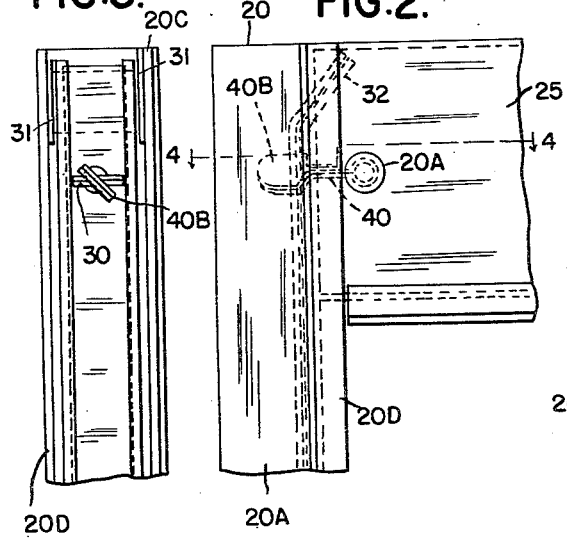
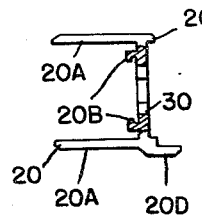
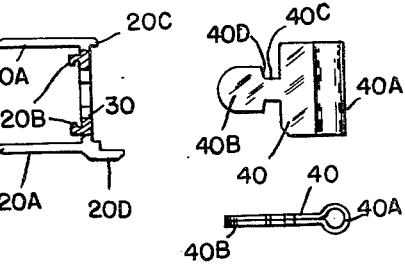
*INVENTOR.*
GUNNAR V. CARLSON
BY
*Hauke & Hardesty*
ATTORNEYS

2,703,635
CORNER CONSTRUCTION FOR WINDOW FRAMES

Gunnar V. Carlson, Detroit, Mich., assignor to Wisco, Inc., Detroit, Mich., a corporation of Michigan Application April 2, 1949, Serial No. 85,195

3 Claims. (Cl. 189—36)

The present invention relates to metallic window frame construction and specifically to corner construction of such frames.

Among the objects of the invention is to provide a corner structure which is simple, secure and inexpensive.

Another object is a corner structure which, while it may be assembled quickly, easily and without special tools, is, nevertheless, firmly held together and rigid.

Still other objects and advantages will be apparent to those skilled in the art upon reference to the following description and the accompanying drawings in which Fig. 1 is a view in elevation of a portion of a window frame including the novel corner structure.

Fig. 2 is an enlarged elevational view of a corner showing the structure more in detail.

Fig. 3 is a view in elevation of the structure of Fig. 2, viewed from the left.

Fig. 4 is a section on line 4—4 of Fig. 2.

Figs. 5 to 9 inclusive show details of the construction.

In the drawings, in Fig. 1, there is shown the upper portion of a window having a frame A and a sliding sash B. The frame A as shown comprises two upright side members 20 in the form of outwardly opening channels and an upper cross member 25 preferably of a box section. Additional members (not shown) cooperate with side members 20 to provide for frame width adjustment, but since these are not a part of the present invention, they are not further described.

The members 20 and 25 may be and preferably are similar in profile at their inner sides and the description of the section of member 20 shown in Fig. 8 will serve also to describe a section of member 25, except for the box section of the latter.

In Fig. 8 the channel member 20 is shown as having side walls 20A and having in the bottom thereof a pair of rails 20B. On the outside of the channel bottom at one side is a shallow outstanding flange 20C and at the other side a deeper flange 20D, these flanges serving to locate certain additional structure adapted to cooperate with the sash B.

In preparing the channels 20 and 25 for junction to form the corner, openings are provided for a suitable rivet or bolt 25A adapted to be fixed through the side walls of channel 25 adjacent the end thereof and sufficient of flange 20D on channel 25 removed so that its end rests against the corresponding flanges 20D on member 20 when the end of member 25 is placed against the end of the latter as indicated in Fig. 2. Further, a narrow slot 30 is cut in the bottom wall of channel 20 at a location which will be opposite to and parallel with rivet 25A when the two members are assembled. Also, the upper end of member 20 is provided with short slots or saw cuts 31' to free a short tongue 32 of a width equal to the distance between the walls of member 25.

The two members 20 and 25 are fixed together by means of the element 40 shown in detail in Figs. 7 and 9, consisting of a folded sheet metal member or clip 40 having at one end a loop or eye portion 40A adapted to fit around the rivet 25A and having at its other end a T-shaped portion or flat head 40B connected to the member by a short neck 40C. The length of the neck 40C should be somewhat more than the thickness of the bottom wall of channel 20 and the distance from the center of the eye portion 40A to the surface 40D, i. e., the under edge of the head 40B, should be substantially the same as the distance from the center of rivet 25A to the inner surface of the bottom of channel 20 when the members are assembled as in Fig. 2.

In assembling the parts for the corner, the previously formed clip 40 is held in place while the rivet 25A is inserted and fixed. The two members 20 and 25 put together with the head 40B projected through slot 30. When the head 40B is partially rotated, the neck 40C, in being twisted, will shorten and draw the members 20 and 25 tightly together. The tongue 32 previously bent forward inserts itself between the side walls of member 25 and, by reason of lateral engagement thereof with the side flanges of member 25, adds additional resistance to stresses tending to twist member 25 out of position. Flange 20D overlaps the member 25 to weatherseal the joint between the two members 20 and 25.

It will be apparent to those skilled in the art to which the present invention pertains that various changes and modifications may be made therein without departing from the spirit of the invention or from the scope of the appended claims.

I claim:

1. In a frame construction for prefabricated metal windows and the like, a pair of right-angularly disposed frame members, one of said frame members having laterally spaced side flange elements and abutting against the other of said frame members, said other frame member having a tongue struck and bent angularly therefrom extending in the direction of said one frame member and having opposite, parallel side edges fitting snugly between and engaging laterally against the flange elements thereof, said other frame member also having a relatively narrow flange extending in the direction of and overlapping a flange element of said one frame member, said relatively narrow flange and said tongue embracing the mentioned flange element of said one frame member, said tongue and said relatively narrow flange co-operating with the flange elements of said other frame member to prevent lateral shifting of the members relative to each other, and means separate from the interfitting and interengaging tongue and flange elements interconnecting said frame members holding them assembled and butted together.

2. In a frame construction for prefabricated metal windows and the like, a pair of right-angularly disposed frame members, one of said frame members having laterally spaced side wall portions and abutting against the other of said frame members, said other frame member having a tongue struck and bent obliquely therefrom extending in the direction of said one frame member and having opposite parallel side edges fitting snugly between and engaging laterally against both side wall portions of said one frame to hold said frame members securely against lateral shifting relative to each other, and means separate from said tongue and wall portions interconnecting said frame members holding them assembled and butted solidly together.

3. In a frame construction for prefabricated metal windows and the like, a pair of right-angularly disposed frame members, one of said frame members being channel-shaped in transverse section to provide two side flanges and abutting endwise against the other of said frame members, said other frame member having a tongue struck and bent obliquely therefrom extending between and having opposite parallel edges snugly fitting, extending diagonally across and engaging laterally against the two side flanges of said one frame member, said other frame member also having a relatively narrow, laterally offset flange extending in the direction of and overlapping a flange of said one frame member, said relatively narrow flange and said tongue embracing the mentioned flange of said one frame member, said tongue and said relatively narrow flange co-operating with the side flanges of said channel-shaped frame member to prevent lateral shifting of the members relative to each other, and means separate from said interfitting and interengaging flanges interconnecting said frame members holding them assembled and butted solidly together.

References Cited in the file of this patent
UNITED STATES PATENTS

| Number | Name | Date |
|---|---|---|
| 1,169,461 | Clark | Jan. 25, 1916 |
| 1,851,608 | Vitali | Mar. 29, 1932 |
| 1,972,997 | Junkers | Sept. 11, 1934 |
| 1,998,366 | Geyer | Apr. 16, 1935 |
| 2,114,617 | Verhagen | Apr. 19, 1938 |
| 2,323,055 | Krueger | June 29, 1943 |